US012593366B2

(12) United States Patent
Geng et al.

(10) Patent No.: US 12,593,366 B2
(45) Date of Patent: Mar. 31, 2026

(54) COMMUNICATION METHOD AND COMMUNICATION APPARATUS

(71) Applicant: HUAWEI TECHNOLOGIES CO., LTD., Guangdong (CN)

(72) Inventors: Tingting Geng, Shanghai (CN); Xingxing Hu, Shanghai (CN); Yedan Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

(21) Appl. No.: 18/303,089

(22) Filed: Apr. 19, 2023

(65) Prior Publication Data

US 2023/0319934 A1      Oct. 5, 2023

Related U.S. Application Data

(63) Continuation of application No. PCT/CN2020/122853, filed on Oct. 22, 2020.

(51) Int. Cl.
*H04W 76/18* (2018.01)

(52) U.S. Cl.
CPC .................................... *H04W 76/18* (2018.02)

(58) Field of Classification Search
CPC ..... H04W 48/08; H04W 60/00; H04W 60/04; H04W 48/00; H04W 68/00
See application file for complete search history.

(56) References Cited

U.S. PATENT DOCUMENTS

2016/0157291 A1      6/2016   Chang et al.

FOREIGN PATENT DOCUMENTS

| CN | 103517408 A | 1/2014 | | |
| CN | 104904260 A | 9/2015 | | |
| CN | 105764065 A | 7/2016 | | |
| GB | 2516467 A | * 1/2015 | ............ | H04W 24/10 |
| WO | WO-2020197458 A1 | * 10/2020 | ............ | H04W 76/18 |

OTHER PUBLICATIONS

CATT, Corrections for CEF and RLF Report, 3GPP TSG RAN WG2#109-e, R2-2000101, Electronic meeting, Feb. 24-Mar. 6, 2020; 9 pages.
CATT, Corrections for CEF Report, 3GPP TSG RAN WG2#109bis-e, R2-2002733, Electronic meeting, Apr. 20-Apr. 30, 2020; 2 pages.
3GPP TR 38.801 V14.0.0 (Mar. 2017); 3rd Generation Partnership Project; Technical Specification Group Radio Access Network; Study on new radio access technology: Radio access architecture and interfaces (Release 14); 91 pages.

* cited by examiner

*Primary Examiner* — Marisol Figueroa
(74) *Attorney, Agent, or Firm* — Rimon PC

(57) ABSTRACT

Embodiments of this application provide a communication method and a communication apparatus. In the method, a terminal device determines that a connection establishment failure between the terminal device and a first cell occurs, records first connection establishment failure information, and starts a timer. The terminal device determines, depending on whether the timer has expired, a manner of how to process connection establishment failure information. The terminal device sends a connection establishment failure report, where the connection establishment failure report indicates that the connection establishment failure has occurred between the terminal device and the first cell. In this way, memory usage and power consumption of the terminal device can be reduced.

9 Claims, 3 Drawing Sheets

S310. Determine that a connection establishment failure between a terminal device and a first cell occurs at a first location, and record first connection establishment failure information S320. Determine that a connection establishment failure between the terminal device and the first cell occurs again at a second location, and determine, based on the first location and the second location, whether to record second connection establishment failure information S330. Send a connection establishment failure report, where the connection establishment failure report indicates that the connection establishment failure occurs between the terminal device and the first cell

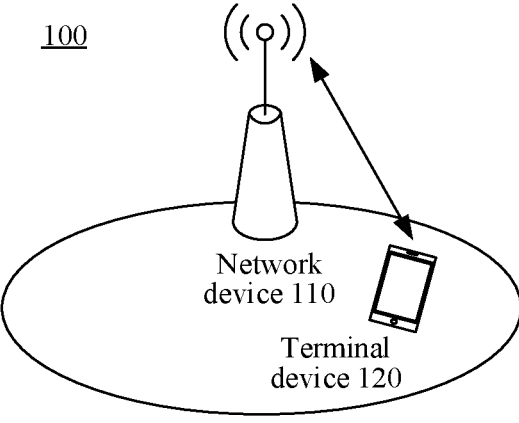

100

Network
device 110

Terminal
device 120

FIG. 1

S210. Determine that a connection
establishment failure between a terminal
device and a first cell occurs, record first
connection establishment failure
information, and start a timer S220. Determine, depending on whether the
timer runs, a manner of processing the first
connection establishment failure information S230. Send a connection establishment
failure report, where the connection
establishment failure report indicates that the
connection establishment failure occurs
between the terminal device and the first cell

FIG. 2

S310. Determine that a connection establishment failure between a terminal device and a first cell occurs at a first location, and record first connection establishment failure information S320. Determine that a connection establishment failure between the terminal device and the first cell occurs again at a second location, and determine, based on the first location and the second location, whether to record second connection establishment failure information S330. Send a connection establishment failure report, where the connection establishment failure report indicates that the connection establishment failure occurs between the terminal device and the first cell

FIG. 3

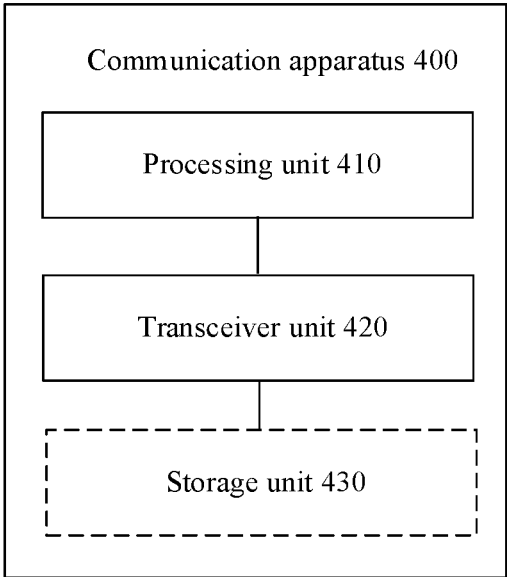

Communication apparatus 400

Processing unit 410

Transceiver unit 420

Storage unit 430

FIG. 4

COMMUNICATION METHOD AND COMMUNICATION APPARATUS

CROSS-REFERENCE TO RELATED APPLICATIONS

This application is a continuation of International Application No. PCT/CN2020/122853, filed on Oct. 22, 2020, the disclosure of which is hereby incorporated by reference in its entirety.

TECHNICAL FIELD

Embodiments of this application relate generally to the communication field, and more specifically, to a communication method and a communication apparatus.

BACKGROUND

In a mobile communication system, a terminal device in a non-connected state may establish a connection between the terminal device and a network device by initiating a connection establishment request. For example, a terminal device in an idle state may establish a radio resource control (RRC) connection by initiating an RRC establishment request (or referred to as an RRC connection establishment request), and a terminal device in an inactive state may establish an RRC connection by initiating an RRC establishment resume request (or referred to as an RRC connection resume request). Various reasons may cause a failure during establishing the connection between the terminal device and the network device, that is, connection establishment fails. The terminal device sends a connection establishment failure report after re-establishing a connection to the network, where the connection establishment failure report includes information related to a latest connection establishment failure, and the like. The network device may analyze the reason of failure and optimize a network configuration and the like based on the connection establishment failure report from the terminal device. However, in a current mechanism, a manner in which the terminal device reports information related to a connection establishment failure may not help the network optimization processing, and a proper feedback mechanism for connection establishment failures needs to be considered.

SUMMARY

Embodiments of this application provide a communication method and a communication apparatus, to reduce memory usage and power consumption of a terminal device.

According to a first aspect, a communication method is provided. The method may be performed by a terminal device or a component (such as a chip or a circuit) disposed in (or for) the terminal device. An example in which the method is performed by the terminal device is used below for description.

The method includes: determining that a connection establishment failure between the terminal device and a first cell occurs, recording first connection establishment failure information, and starting a timer: determining, depending on whether the timer expires, a manner of processing the first connection establishment failure information; and sending a connection establishment failure report, where the connection establishment failure report indicates that the connection establishment failure occurs between the terminal device and the first cell.

According to the foregoing solution, determining, depending on whether the timer expires, how to process the connection establishment failure information can reduce memory usage and power consumption of the terminal device.

With reference to the first aspect, in some implementations of the first aspect, the determining, depending on whether the timer expires, a manner of processing connection establishment failure information includes: during the running of the timer, stopping recording the connection establishment failure information; or during the running of the timer, determining that a connection establishment failure between the terminal device and the first cell occurs again, and updating indication information to indicate a quantity of connection establishment failures in the first connection establishment failure information, where the connection establishment failure report includes the first connection establishment failure information.

According to the foregoing solution, during the running of the timer, the terminal device stops recording the connection establishment failure information; or during the running of the timer, if the connection establishment failure between the terminal device and the first cell occurs again, the terminal device updates only the indication information indicating the quantity of connection establishment failures in the first connection establishment failure information. In this way, the probability that the terminal device records similar connection establishment failure information at a same location or a close location can be reduced, and memory usage and power consumption of the terminal device can be reduced.

With reference to the first aspect, in some implementations of the first aspect, the determining, depending on whether the timer expires, a manner of processing the first connection establishment failure information includes: during the running of the timer, determining that a connection establishment failure between the terminal device and the first cell occurs again, recording second connection establishment failure information and deleting third connection establishment failure information, where the third connection establishment failure information is the first connection establishment failure information or connection establishment failure information recorded after the first connection establishment failure information, and the connection establishment failure report includes the second connection establishment failure information.

According to the foregoing solution, while the timer is running, if the connection establishment failure between the terminal device and the first cell occurs again, the second connection establishment failure information is recorded and the third connection establishment failure information is deleted. In other words, during the running of the timer, the terminal device stores only one piece of connection establishment failure information. In this way, the probability that the terminal device records similar connection establishment failure information at a same location or a close location can be reduced, and memory usage and power consumption of the terminal device can be reduced.

With reference to the first aspect, in some implementations of the first aspect, the method further includes: after the timer expires, determining that a connection establishment failure between the terminal device and the first cell occurs again, recording fourth connection establishment failure information, and starting the timer. The connection establishment failure report includes the fourth connection establishment failure information.

According to the foregoing solution, after the timer expires, if the connection establishment failure between the terminal device and the first cell occurs again, the fourth connection establishment failure information is recorded, and the processing of the connection establishment failure information recorded before the timer expires is stopped, so that the terminal device can record connection establishment failure information during a time interval. After the terminal device establishes a connection to the network, the terminal device may provide a large amount of information related to connection establishment failure for the network device, so that the network device optimizes a network configuration more accurately. This can improve network performance.

With reference to the first aspect, in some implementations of the first aspect, the method further includes: stopping the timer when the terminal device moves to a second cell or the terminal device successfully establishes a connection to the first cell during the running of the timer.

According to the foregoing solution, the timer is used by the terminal device to determine the manner of processing the connection establishment failure information. After the terminal device moves to the second cell or successfully establishes the connection to the first cell, the timer is stopped to reduce unnecessary power consumption of the terminal device.

With reference to the first aspect, in some implementations of the first aspect, before the starting of a timer, the method further includes: determining that a moving speed of the terminal device is less than or equal to a first threshold.

According to the foregoing solution, if the moving speed of the terminal device is low; the locations at which two consecutive connection establishment failures occur on the terminal device may be the same or close, and connection establishment failure information (for example, measurement information of the first cell) may also be similar. The probability that the terminal device records similar connection establishment failure information can be reduced by starting the timer. In this way, memory usage and power consumption of the terminal device are reduced.

With reference to the first aspect, in some implementations of the first aspect, the method further includes: receiving first indication information from a first network device, where the first indication information indicates a running duration of the timer, and the first network device is a network device managing the first cell.

According to a second aspect, a communication method is provided. The method may be performed by a network device or a component (such as a chip or a circuit) disposed in (or for) the network device. An example in which the method is performed by the network device is used below for description.

The method includes: sending first indication information to a terminal device, where the first indication information indicates a running duration of a timer, and the timer is used by the terminal device to determine a manner of processing connection establishment failure information.

According to a third aspect, a communication method is provided. The method may be performed by a terminal device or a component (such as a chip or a circuit) disposed in (or for) the terminal device. An example in which the method is performed by the terminal device is used below for description.

The method includes: determining that the terminal device fails in establishing a connection between the terminal device and a first cell at a first location, and recording first connection establishment failure information; determining that the terminal device fails in establishing a connection between the terminal device and the first cell again at a second location, and determining, based on the first location and the second location, whether to record second connection establishment failure information; and sending a connection establishment failure report, where the connection establishment failure report indicates that a connection establishment failure has occurred between the terminal device and the first cell.

According to the foregoing solution, based on a location of the terminal device when connection establishment failure information is recorded, whether to record connection establishment failure information again or update the connection establishment failure information is determined. In this way, a probability that the terminal device records same or similar connection establishment failure information can be reduced, and memory usage and power consumption of the terminal device can be reduced.

With reference to the third aspect, in some implementations of the third aspect, the determining, based on the first location and the second location, whether to record second connection establishment failure information includes: determining that a distance between the first location and the second location is greater than or equal to a first threshold, and recording the second connection establishment failure information; and/or determining that the distance between the first location and the second location is less than the first threshold, and skipping recording the second connection establishment failure information. With reference to the third aspect, in some implementations of the third aspect, the determining, based on the first location and the second location, whether to record second connection establishment failure information includes: determining that the distance between the first location and the second location is less than or equal to the first threshold, recording the second connection establishment failure information, and deleting the first connection establishment failure information.

With reference to the third aspect, in some implementations of the third aspect, the method further includes: starting a timer after determining that the terminal device fails in establishing a connection between the terminal device and a first cell at a first location.

With reference to the third aspect, in some implementations of the third aspect, the determining, based on the first location and the second location, whether to record second connection establishment failure information includes: determining that the distance between the first location and the second location is less than or equal to first threshold, and updating the indication information to indicate a quantity of connection establishment failures in the first connection establishment failure information when the timer has not expired.

With reference to the third aspect, in some implementations of the third aspect, the method further includes: receiving first indication information from a first network device, where the first indication information indicates the first threshold, and the first network device is a network device managing the first cell.

According to a fourth aspect, a communication method is provided. The method may be performed by a network device or a component (such as a chip or a circuit) disposed in (or for) the first network device. An example in which the method is performed by the network device is used below for description.

The method includes: sending first indication information to a terminal device, where the first indication information indicates a first threshold, and the first threshold is used by the terminal device to determine whether to record connection establishment failure information.

According to a fifth aspect, a communication apparatus is provided. In a design, the apparatus may include a module that performs the method/operation/step/action described in the first aspect. The module may be implemented by using a hardware circuit, software, or a combination of a hardware circuit and software. In a design, the apparatus includes: a processing unit (e.g., processing circuits), configured to determine that a connection establishment failure between a terminal device and a first cell occurs, record the first connection establishment failure information, and start a timer, where the processing unit is further configured to determine, depending on whether the timer is running, a manner of processing connection establishment failure information; and a transceiver unit (e.g., a transceiver), configured to send a connection establishment failure report, where the connection establishment failure report indicates that the connection establishment failure occurs between the terminal device and the first cell.

With reference to the fifth aspect, in some implementations of the fifth aspect, the processing unit is configured to stop recording connection establishment failure information during the running of the timer: or the processing unit is configured to: while the timer is still running, determine that a connection establishment failure between the terminal device and the first cell occurs again, and update indication information to indicate a quantity of connection establishment failures in the first connection establishment failure information, where the connection establishment failure report includes the first connection establishment failure information.

With reference to the fifth aspect, in some implementations of the fifth aspect, the processing unit is configured to: during the running of the timer, determine that a connection establishment failure between the terminal device and the first cell occurs again, record second connection establishment failure information and delete third connection establishment failure information, where the third connection establishment failure information is the first connection establishment failure information or connection establishment failure information recorded after the first connection establishment failure information, and the connection establishment failure report includes the second connection establishment failure information.

With reference to the fifth aspect, in some implementations of the fifth aspect, the processing unit is further configured to: after the timer expires, determine that a connection establishment failure between the terminal device and the first cell occurs again, record fourth connection establishment failure information, and start the timer, where the connection establishment failure report includes the fourth connection establishment failure information.

With reference to the fifth aspect, in some implementations of the fifth aspect, the processing unit is further configured to stop the timer when the terminal device moves to a second cell or the terminal device successfully establishes a connection to the first cell during the running of the timer.

With reference to the fifth aspect, in some implementations of the fifth aspect, before starting the timer, the apparatus further includes: determining that a moving speed of the terminal device is less than or equal to a first threshold.

With reference to the fifth aspect, in some implementations of the fifth aspect, the transceiver unit is further configured to receive first indication information from a first network device, where the first indication information indicates a running duration of the timer, and the first network device is a network device managing the first cell.

According to a sixth aspect, a communication apparatus is provided. In a design, the apparatus may include a module that performs the method/operation/step/action described in the second aspect. The module may be implemented by using a hardware circuit, software, or a combination of a hardware circuit and software. In a design, the apparatus includes: a processing unit, configured to determine running duration of a timer, where the timer is used by a terminal device to determine a manner of processing connection establishment failure information; and a transceiver unit, configured to send first indication information to the terminal device, where the first indication information indicates the running duration of the timer.

According to a seventh aspect, a communication apparatus is provided. In a design, the apparatus may include a module that performs the method/operation/step/action described in the third aspect. The module may be implemented by using a hardware circuit, software, or a combination of a hardware circuit and software. In a design, the apparatus includes: a processing unit configured to determine that a terminal device fails in establishing a connection between the terminal device and a first cell at a first location, and record first connection establishment failure information. The processing unit is further configured to determine that the terminal device fails in establishing a connection between the terminal device and the first cell again at a second location, and determine, based on the first location and the second location, whether to record second connection establishment failure information; and a transceiver unit, configured to send a connection establishment failure report, where the connection establishment failure report indicates that a connection establishment failure occurs between the terminal device and the first cell.

With reference to the seventh aspect, in some implementations of the seventh aspect, the processing unit is configured to determine that a distance between the first location and the second location is greater than or equal to a first threshold, and record the second connection establishment failure information; and/or the processing unit is configured to determine that the distance between the first location and the second location is less than the first threshold, and skip recording the second connection establishment failure information. With reference to the seventh aspect, in some implementations of the seventh aspect, the transceiver unit is further configured to receive first indication information from a first network device, where the first indication information indicates the first threshold, and the first network device is a network device managing the first cell.

With reference to the seventh aspect, in some implementations of the seventh aspect, the processing unit is configured to record the second connection establishment failure information and delete the first connection establishment failure information when the distance between the first location and the second location is less than or equal to the first threshold.

With reference to the seventh aspect, in some implementations of the seventh aspect, the processing unit is further configured to start a timer after determining that the terminal device fails in establishing the connection between the terminal device and the first cell at a first location.

With reference to the seventh aspect, in some implementations of the seventh aspect, the processing unit is configured to: when the distance between the first location and the second location is less than or equal to the first threshold, and the timer does not expire, update indication information indicating a quantity of connection establishment failures in the first connection establishment failure information.

According to an eighth aspect, a communication apparatus is provided. In a design, the apparatus may include a module that performs the method/operation/step/action described in the fourth aspect. The module may be implemented by using a hardware circuit, software, or a combination of a hardware circuit and software. In a design, the apparatus includes: a processing unit configured to determine a first threshold, where the first threshold is used by a terminal device to determine whether to record connection establishment failure information; and a transceiver unit configured to send first indication information to the terminal device, where the first indication information indicates the first threshold.

According to a ninth aspect, a communication apparatus is provided, and includes a processor. The processor may implement the method in any one of the first aspect, the third aspect, or the possible implementations of the first aspect or the third aspect. Optionally, the communication apparatus further includes a memory. The processor is coupled to the memory, and may be configured to execute instructions in the memory, to implement the method in any one of the first aspect, the third aspect, or the possible implementations of the first aspect or the third aspect. Optionally, the communication apparatus further includes a communication interface, and the processor is coupled to the communication interface. In this embodiment of this application, the communication interface may be a transceiver, a pin, a circuit, a bus, a module, or another type of communication interface. This is not limited.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally: the transceiver may be a transceiver circuit. Optionally, the input/output interface may be an input/output circuit.

According to a tenth aspect, a communication apparatus is provided, and includes a processor. The processor may implement the method in any one of the second aspect, the fourth aspect, or the possible implementations of the second aspect or the fourth aspect. Optionally, the communication apparatus further includes a memory. The processor is coupled to the memory; and may be configured to execute instructions in the memory, to implement the method in any one of the second aspect, the fourth aspect, or the possible implementations of the second aspect or the fourth aspect. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip disposed in a network device. When the communication apparatus is the chip disposed in the network device, the communication interface may be an input/output interface.

Optionally, the transceiver may be a transceiver circuit. Optionally, the input/output interface may be an input/output circuit.

According to an eleventh aspect, a processor is provided, and includes an input circuit, an output circuit, and a processing circuit. The processing circuit is configured to: receive a signal by using the input circuit, and transmit a signal by using the output circuit, so that the processor is enabled to perform the method in any one of the first aspect to the fourth aspect and the possible implementations of the first aspect to the fourth aspect.

In a specific implementation process, the processor may be one or more chips, the input circuit may be an input pin, the output circuit may be an output pin, and the processing circuit may be a transistor, a gate circuit, a trigger, various logic circuits, or the like. The input signal received by the input circuit may be received and input by, for example, but not limited to, a receiver, the signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in this embodiment of this application.

According to a twelfth aspect, a computer program product is provided. The computer program product includes: a computer program (which may also be referred to as code or instructions). When the computer program is run, a computer is enabled to perform the method in any one of the first aspect to the fourth aspect and the possible implementations of the first aspect to the fourth aspect.

According to a thirteenth aspect, a computer-readable storage medium is provided. The computer-readable storage medium stores a computer program (which may also be referred to as code or instructions). When the computer program is run on a computer, the computer is enabled to perform the method in any one of the first aspect to the fourth aspect and the possible implementations of the first aspect to the fourth aspect.

According to a fourteenth aspect, a communication system is provided, and includes the foregoing terminal device and the foregoing network device.

BRIEF DESCRIPTION OF DRAWINGS

FIG. 1 is a schematic diagram of a wireless communication system applicable to an embodiment of this application;

FIG. 2 is a schematic flowchart of a communication method applicable to an embodiment of this application:

FIG. 3 is another schematic flowchart of a communication method applicable to an embodiment of this application:

FIG. 4 is a schematic block diagram of a communication apparatus according to this application:

DESCRIPTION OF EMBODIMENTS

Figure 5:
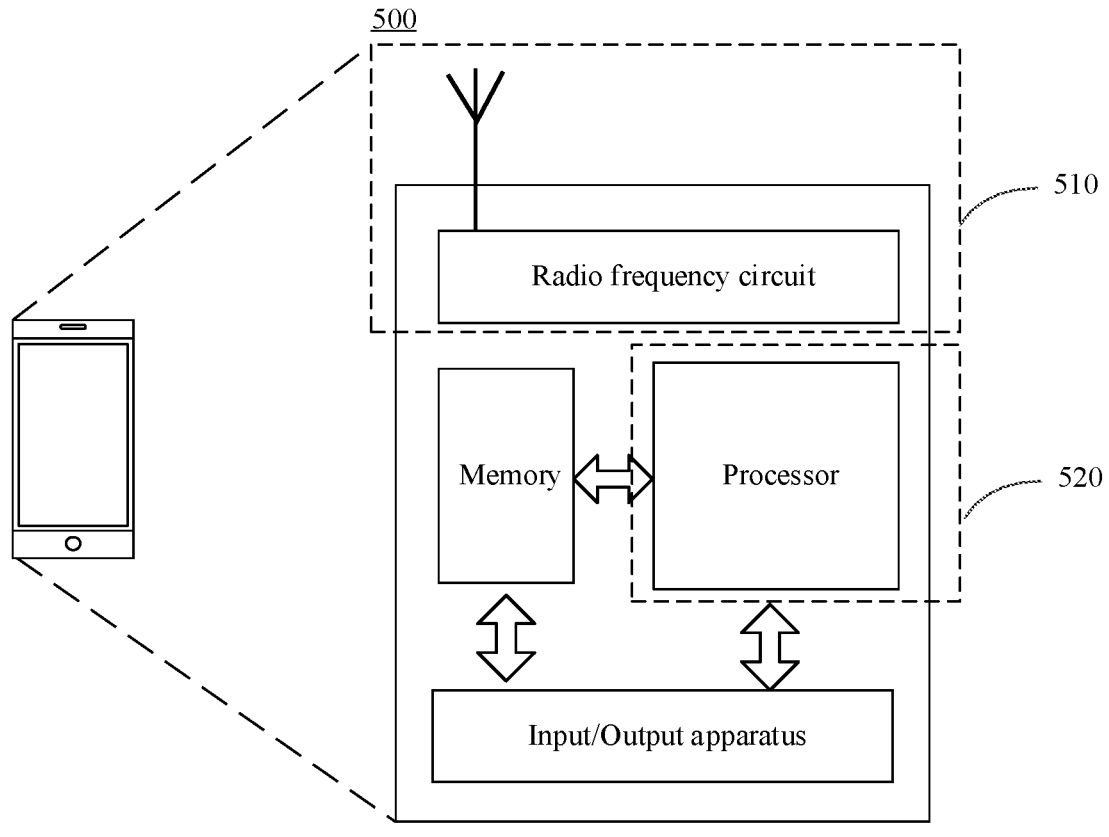
FIG. 5 is a schematic diagram of a structure of a terminal device applicable to an embodiment of this application.

Technical solutions of embodiments of this application may be applied to various communication systems, such as a long term evolution (LTE) system, an LTE frequency division duplex (FDD) system, LTE time division duplex (TDD), a universal mobile telecommunications system (UMTS), a worldwide interoperability for microwave access (WiMAX) communication system, a 5th generation (5G) communication system, a new radio (NR) access technology, vehicle-to-X (V2X) communication, internet of vehicles, machine type communication (MTC), or internet of things (IoT). V2X may include vehicle to network (V2N), vehicle to-vehicle (V2V), vehicle to infrastructure (V2I), vehicle to pedestrian (V2P), and/or the like.

FIG. 1 is a schematic diagram of a wireless communication system 100 applicable to an embodiment of this application.

As shown in FIG. 1, the wireless communication system 100 may include at least one network device, for example, a network device 110 shown in FIG. 1. The wireless communication system 100 may further include at least one terminal device, for example, a terminal device 120 shown in FIG. 1. The terminal device 120 may be a terminal device in an idle state or in an inactive state. The terminal device may establish a connection to the network device by initiating a connection establishment request.

The terminal device in this embodiment of this application may also be referred to as user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device in this embodiment of this application may be a mobile phone, a pad, a computer with a wireless transceiver function, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device with a wireless communication function, a computing device, another processing device, a vehicle-mounted device, a wearable device, a terminal device in a 5G network, a terminal device in a future evolved public land mobile network (PLMN), or the like.

The wearable device may also be referred to as a wearable intelligent device, and is a general term for wearable devices, such as glasses, gloves, watches, clothes, and shoes, that are developed by applying wearable technologies to intelligent designs of daily wear. The wearable device is a portable device that is directly worn on a body or integrated into clothes or an accessory of a user. The wearable device is not merely a hardware device, but is used to implement a powerful function through software support, data interaction, and cloud interaction. In a broad sense, the wearable intelligent device includes a full-featured and large-sized device that can implement all or some functions without depending on a smartphone, for example, a smart watch or smart glasses, and includes a device that is dedicated to only one type of application function and needs to collaboratively work with another device such as the smartphone, for example, various smart bands, or smart jewelry for monitoring physical signs.

It should be understood that a specific form of the terminal device is not limited in this embodiment of this application.

The network device in this embodiment of this application may be a device with a wireless transceiver function. The device includes but is not limited to a base station, an evolved NodeB (eNB), a radio network controller (RNC), a NodeB (NB), a base station controller (BSC), a base transceiver station (BTS), a home base station (for example, a home evolved NodeB, or home NodeB. HNB), a baseband unit (BBU), or an access point (AP), a wireless relay node, a wireless backhaul node, a transmission point (TP), a transmission reception point (TRP), or the like in a wireless fidelity (Wi-Fi) system, or may be an access network (RAN) device in a 5G (such as NR) system, such as a next generation NodeB (gNB), a TRP, or a TP, or one antenna panel or a group of (including a plurality of antenna panels) antenna panels of a base station in a 5G system.

In some deployment, the gNB may include a central unit (CU) and a DU. The gNB may further include an active antenna unit (AAU for short). The CU implements some functions of the gNB, and the DU implements some functions of the gNB. For example, the CU is responsible for processing a non-real-time protocol and service, and implementing functions of a radio resource control (RRC) layer and a packet data convergence protocol (PDCP) layer. The DU is responsible for processing a physical layer protocol and a real-time service, and implementing functions of a radio link control (RLC) layer, a media access control (MAC) layer, and a physical (PHY) layer. The AAU implements some physical layer processing functions, and functions related to radio frequency processing and an active antenna. Information at the RRC layer eventually becomes information at the PHY layer, or is converted from information at the PHY layer. Therefore, in this architecture, higher layer signaling such as RRC layer signaling may also be considered as being sent by the DU or sent by the DU and the AAU. It may be understood that the CU may further include a CU-control plane (CU-CP) and a CU-user plane (CU-UP). The CU-CP may be responsible for a control plane function, for example, implementing control plane functions (PDCP-C) at the RRC layer and the PDCP layer. The CU-UP may be responsible for a user plane function, for example, implementing user plane functions (PDCP-U) at an SDAP layer and the PDCP layer. The CU-CP communicates with the CU-UP through an E1 interface. The CU-CP may communicate with a core network through an NG interface on behalf of the gNB, and communicate with the DU through an F1-C interface. The CU-UP may communicate with the DU through an F1-U interface. In another implementation, the CU-UP may implement a function of a PDCP-C, but this application is not limited thereto. In addition, the CU may be classified as a network device in an access network (RAN), or the CU may be classified as a network device in the core network (CN). This is not limited in this application.

The network device provides a service for a cell, and the terminal device communicates with the network device in the cell by using a transmission resource (for example, a frequency domain resource, or a spectrum resource) allocated by the network device. The cell may belong to a macro base station (for example, a macro eNB or a macro gNB), or may belong to a base station corresponding to a small cell. The small cell herein may include: a metro cell, a micro cell, a pico cell, a femto cell, or the like. These small cells are characterized by small coverage and low transmit power, and are applicable to providing a high-speed data transmission service.

In a mobile communication system, a terminal device in a non-connected state may re-establish a connection to a network device by using a random access procedure. Specifically, the terminal device may re-establish a connection to the network device by using a four-step random access procedure or a two-step random access procedure.

If the terminal device uses the four-step random access procedure, in any one of the following scenarios, the terminal device may determine that a connection establishment failure (CEF) occurs. It may be understood that, that the terminal device uses the four-step random access may include that the terminal device directly uses the four-step random access, or that the terminal device first re-establishes a connection to the network device by using the two-step random access procedure, and then falls back to the four-step random access procedure.

Scenario 1: A quantity of times that the terminal device sends a message 1 (msg1 or MSG1) in a random access procedure reaches a maximum quantity, or the power used by the terminal device to send a msg1 reaches maximum transmit power, and no random access response message, that is, message 2 (msg2 or MSG2), is received from the network device.

Scenario 2: The terminal device receives a msg2 and sends a message 3 (msg3 or MSG3), but does not receive a message 4 (msg4 or MSG4) from the network device, or receives a msg4, but a contention resolution identity in the msg4 is not of the terminal device, that is, contention resolution fails. Alternatively, the terminal device receives a msg2 but cannot successfully send a msg3, and the terminal device re-sends a msg1, so that finally, a quantity of times that the terminal device sends the msg1 reaches a maximum quantity, or the power used by the terminal device to send the msg1 reaches maximum transmit power.

Scenario 3: Contention resolution succeeds in the msg4, but an RRC connection still fails to be established.

Similar to the four-step random access procedure, if the terminal device re-establishes a connection to the network device by using the two-step random access procedure, in any one of the following scenarios, the terminal device may determine that a connection establishment failure occurs.

A quantity of times that the terminal device sends a message A (msgA or MSGA) reaches a maximum quantity, the power used by the terminal device to send the msgA reaches maximum transmit power, no message B (msgB or MSGB) is received from the network device, contention resolution fails, or an RRC connection still fails to be established although contention resolution succeeds.

In the foregoing four-step random access procedure and the two-step random access procedure, the terminal may determine, based on different connection establishment failure scenarios, that the CEF occurs. It may be understood that the foregoing is an example of a possible scenario in which the terminal device determines that a connection establishment failure occurs. Alternatively, the terminal device may determine, based on another scenario or situation, that a connection establishment failure occurs. This is not limited in this application.

After the terminal device determines that a connection establishment failure occurs, the terminal device sends a connection establishment failure report to the network device. After obtaining the connection establishment failure report from the terminal device, the network device may perform problem analysis, optimize a network configuration, and the like. For example, the network device determines that the connection establishment failure of the terminal device may be caused by a mismatch between uplink coverage and downlink coverage of the network device, poor downlink coverage, or the like, so that the coverage can be optimized. However, a plurality of connection establishment failures may occur before the terminal device successfully establishes a connection to the network. If the terminal device sends information related to a connection establishment failure only once (for example, a latest connection establishment failure), the network device may not accurately determine the failure cause, and therefore cannot properly optimize a network configuration. In addition, after each connection establishment failure, if the terminal device records information related to the connection establishment failure, and reports the information to the network after a connection is successfully established, both the power consumption of the terminal device and signaling overheads are high.

This application provides a communication method. A terminal device determines that a connection establishment failure between the terminal device and a first cell occurs, records first connection establishment failure information, and starts a timer. The terminal device determines, depending on whether the timer is still running, a manner of processing the recorded connection establishment failure information (for example, the first connection establishment failure information). After the terminal device establishes a connection to a network, the recorded connection establishment failure information between the terminal device and the first cell is sent to the network. Through the method, the probability that the terminal device records similar connection establishment failure information at a same location or a close location can be reduced, and the memory usage and power consumption of the terminal device can be reduced. After a first network device managing the first cell obtains, from the terminal device, the connection establishment failure information indicating a failed attempt of connection establishment with the first cell, the network device can be optimized more accurately, and the communication performance of the network can be improved.

In embodiments of this application. "/" may indicate an "or" relationship between associated objects. For example, A/B may represent A or B. "And/or" may be for describing that the associated objects have three relationships. For example, A and/or B may represent the following three cases: Only A exists, both A and B exist, and only B exists, where A and B may be singular or plural. For ease of describing the technical solutions in embodiments of this application, terms such as "first" and "second" may be used in embodiments of this application to distinguish between technical features with same or similar functions. The terms such as "first" and "second" do not limit a quantity and an execution sequence, and the terms such as "first" and "second" do not indicate a definite difference. In embodiments of this application, a word such as "for example", or "such as" is for representing giving an example, an illustration, or a description. Any embodiment or design scheme described as "for example" or "such as" should not be explained as being more preferred or having more advantages than another embodiment or design scheme. Use of the word such as "for example", or "such as" is intended to present a related concept in a specific manner of ease of understanding. In embodiments of this application, at least one (type) may also be described as one (one type) or a plurality of (a plurality of types), and the plurality of (the plurality of types) may be two (two types), three (three types), four (four types), or more (more types). This is not limited in this application.

It should be understood that in embodiments of this application, the terminal device and/or the network device may perform some or all steps in embodiments of this application. These steps or operations are merely examples. In embodiments of this application, other operations or variations of various operations may be further performed. In addition, the steps may be performed in different sequences presented in embodiments of this application, and it is possible that not all operations in embodiments of this application need to be performed.

FIG. 2 is a schematic flowchart of a communication method according to an embodiment of this application.

S210. A terminal device determines that a connection establishment failure between the terminal device and a first cell occurs, records first connection establishment failure information, and starts a timer.

For example, a terminal device in a non-connected state may initiate connection establishment to the first cell due to a service requirement. However, because the quantity of sending times of a random access msg1/msgA reaches a maximum quantity, or the power reaches maximum transmit power, or a msg2/msgB is received from a network device, or another reason, the terminal device determines that the connection establishment between the terminal device and the first cell fails (for example, the connection establishment fails for the first time). The terminal device records failure information related to the current connection establishment failure, that is, the first connection establishment failure information. After the terminal device determines that the connection establishment failure between the terminal device and the first cell occurs, the terminal device starts the timer.

In an example, connection establishment failure information may include a cell identifier (that is, an identifier of the first cell) of a cell with a connection establishment failure. The cell identifier may include at least one of a cell global identifier (CGI), a physical cell identifier (PCI) and a frequency, a cell identifier (cell ID), a non-public network identifier (NPN ID), a non-terrestrial network identifier (NTN ID), or another cell identifier of the cell. The CGI may include a public land mobile network (PLMN) ID and a cell ID. Optionally, the cell identifier may further include a tracking area code (TAC) and/or identification information of a network device to which the cell belongs, for example, a global network device identifier. Optionally, the cell identifier may be a cell identifier of a cell corresponding to a cell accessed by the terminal device, or may be a cell identifier of the 1$^{st}$ cell in information about at least one cell that is sent by a cell accessed by the terminal device. For example, PLMN1+CELL ID1+TAC1 and PLMN2+CELL ID2+TAC2 are sent by the cell accessed by the terminal device, and the cell accessed by the terminal device is PLMN2+CELL ID2+TAC2. A cell identifier recorded by the terminal device may be PLMN ID1+CELL ID1+TAC1 and/or PLMN ID2+CELL ID2+TAC2.

The connection establishment failure information may further include at least one of the following information: a measurement result (for example, measResult) of a cell with a connection establishment failure, location information (for example, locationInfo) at a moment of the connection establishment failure, a measurement result (for example, measResultNeighCells) of a neighboring cell at the moment of the connection establishment failure, random access information (for example, perRAInfoList) in a process of the connection establishment failure, or time information (for example, timeSinceFailure) after the connection establishment failure. The measurement result includes identification information of a synchronization signal/physical broadcast channel block (SSB) or channel-state information reference signal (CSI-RS), or identification information of an SSB/CSI-RS and a measurement value based on the SSB/CSI-RS. The measurement value may be at least one of reference signal received power (RSRP), reference signal received quality (RSRQ), a signal-to-noise ratio (SNR), or a signal to interference plus noise ratio (SINR).

Optionally, the connection establishment failure information may further include a total quantity of connection establishment failures during the running of the timer.

It should be understood that the content of the foregoing connection establishment failure information is merely an example, and this application is not limited thereto.

It should be noted that, the terminal device may record the first connection establishment failure information and start the timer after the terminal device determines that the connection establishment failure between the terminal device and the first cell has occurred. A sequence of recording the first connection establishment failure information and starting the timer is not limited in this application.

Optionally, the running duration of the timer is specified in a protocol, or the terminal device receives configuration information from a first network device, where the configuration information is for configuring the running duration of the timer, and the first network device is a network device managing the first cell. In other words, the first cell belongs to the first network device, or the first cell is within coverage of the first network device. The duration of the timer and a manner of setting the duration are not limited in this embodiment of this application.

As an example and without limitation, the configuration information of the timer is carried in a system message of the first cell.

For example, the configuration information of the timer is carried in a master information block (MIB), a system information block (SIB) 1, or another system message of the first cell.

S220. The terminal device determines, depending on whether the timer is running, a manner of processing connection establishment failure information.

The terminal device may determine, depending on whether the timer is running, the manner of processing the connection establishment failure information, so that a connection establishment failure report recorded by the terminal device with repeated or similar content can be reduced, and memory usage and power consumption of the terminal device can be reduced. Specifically, the determining may include but is not limited to one or more of the following implementations.

Implementation 1: During the running of the timer, recording the connection establishment failure information is stopped, and the first connection establishment failure information is reserved.

After starting the timer in S210, the terminal device stops recording the connection establishment failure information during the running of the timer. To be specific, in a period of time (namely: within the running duration of the timer) after the first connection establishment failure information is recorded, the terminal device skips recording the connection establishment failure information even if a connection establishment failure between the terminal device and the first cell occurs. To be specific, during the running of the timer, the first connection establishment failure information is stored and is not updated. In the implementation 1, the probability that the terminal device records similar connection establishment failure information at a same location or a close location can be reduced, and memory usage and power consumption of the terminal device can be reduced.

Implementation 2: During the running of the timer, if the terminal device determines that a connection establishment failure between the terminal device and the first cell occurs again, the terminal device updates indication information indicating a quantity of connection establishment failures in the first connection establishment failure information.

After the terminal device starts the timer in S210, while the time is still running, the terminal device records only information related to a connection establishment failure that occurs during running of the timer, for example, records a quantity of connection establishment failures, and skips recording other information related to a connection failure process. However, this application is not limited thereto.

For example, after the terminal device starts the timer in S210, while the time is still running, if the terminal device re-initiates connection establishment with the first cell and determines that a failure occurs again, the terminal device updates indication information to indicate a quantity of connection establishment failures in the first connection establishment failure information, and skips recording or updating other information related to the connection establishment failure. For example, the information recorded by the terminal device is failure information corresponding to the $1^{st}$ connection establishment failure and the indication information indicating the quantity of connection establishment failures. After the timer expires, the indication information indicating the quantity of connection establishment failures indicates a quantity of connection establishment failures that occur during running of the timer. In the implementation 2, a probability that the terminal device records similar connection establishment failure information at a same location or a close location can be reduced, and the memory usage and power consumption of the terminal device can be reduced. In addition, the network device may determine the quantity of connection establishment failures during the running of the timer, and determine the seriousness of the problem, to determine a proper network configuration optimization.

Implementation 3: During the running of the timer, if the terminal device determines that a connection establishment failure between the terminal device and the first cell occurs again, the terminal device records second connection establishment failure information, and deletes third connection establishment failure information, where the third connection establishment failure information is the first connection establishment failure information or connection establishment failure information recorded after the first connection establishment failure information. It may be learned that in the implementation 3, during the running of the timer, if the connection establishment failure between the terminal device and the first cell occurs, the first connection establishment failure information is updated. The second connection establishment failure information is the last updated connection establishment failure information. To be specific, the first connection establishment failure information is updated to the connection establishment failure information corresponding to the $2^{nd}$ connection establishment failure.

To be specific, during the running of the timer, if the terminal device determines that the connection establishment failure between the terminal device and the first cell occurs again, the terminal device deletes the connection establishment failure information recorded previously, namely, the third connection establishment failure information, and records information about a current connection establishment failure that occurs, namely, the second connection establishment failure information. The third connection establishment failure information may be the first connection establishment failure information. For example, if the current connection establishment failure is a connection establishment failure that occurs for the first time after the timer is started, the terminal device records the second connection establishment failure information, and deletes the first connection establishment failure information. Alternatively, if one or more connection establishment failures occur after the first connection establishment failure information is recorded, the third connection establishment failure information is recorded after a connection establishment failure that occurs before the current connection establishment failure.

It should be noted that a sequence in which the terminal device records the connection establishment failure information and deletes the third connection establishment failure information is not limited in this application.

Optionally, the second connection establishment failure information includes indication information indicating a quantity of connection establishment failures, and the indication information indicating the quantity of connection establishment failures indicates a total quantity of connection establishment failures that occur during running of the timer and before the second connection establishment failure information is recorded.

For example, the terminal device determines that the $1^{st}$ connection establishment failure between the terminal device and the first cell occurs, denoted as a CEF 1, and the terminal device records the first connection establishment failure information corresponding to the CEF 1 and starts the timer. The terminal device may record a quantity of connection establishment failures as 1. If the terminal device determines that a CEF 2 between the terminal device and the first cell occurs during the running of the timer, the terminal device records the connection establishment failure information corresponding to the CEF 2, and deletes the first connection establishment failure information corresponding to the CEF 1. The terminal device updates the quantity of connection establishment failures to 2. In this case, the terminal device keeps the timer running. If a CEF 3 between the terminal device and the first cell further occurs during the running of the timer, the terminal device records the connection establishment failure information corresponding to the CEF 3, and deletes the connection establishment failure information corresponding to the CEF 2. The terminal device updates the quantity of connection establishment failures to 3. If a connection establishment failure occurs again, a same processing method is used until the timer expires (or the timer stops at the end of the running duration).

It should be noted that the connection establishment failure is a connection establishment failure determined by the terminal device in a same cell (for example, the first cell), and the timer is started by the terminal device when detecting the $1^{st}$ connection establishment failure. If the connection establishment failures occur in different cells, the connection establishment failure information may be recorded without considering a limitation of the timer.

In the implementation 3, during the running of the timer, each time a connection establishment failure occurs between the terminal device and the first cell, the terminal device deletes the connection establishment failure information recorded previously and records new connection establishment failure information. In this way, the probability that the terminal device records similar connection establishment failure information at a same location or a close location can be reduced, and the memory usage and power consumption of the terminal device can be reduced. In the implementation 3, the network device may further obtain connection establishment failure information corresponding to a latest connection establishment failure during the running of the timer, so that the network device can determine the latest connection establishment failure, to determine a proper optimization mechanism.

Optionally: after the timer expires, if the terminal device determines that a connection establishment failure between the terminal device and the first cell occurs again, the terminal device records fourth connection establishment failure information, and starts the timer again.

Optionally, the running duration of the timer started again by the terminal device may be the same as or different from the running duration of the timer started previously:

For example, the terminal device may adjust, based on a quantity of connection establishment failures that occur previously during the running of the timer and based on a specific proportion, the running duration of the timer started next time. However, this application is not limited thereto.

Optionally, after the terminal device determines that the connection establishment failure between the terminal device and the first cell occurs and starts the timer, the terminal device may enter an uplink coverage test procedure for the first cell. After the timer expires, the terminal device may initiate a connection establishment request or a connection resume request to test an uplink coverage status at a location of the terminal device. For example, a request reason may be a "connection establishment failure", an "uplink failure", an "uplink coverage test", or the like.

In other words, after determining that the connection establishment failure between the terminal device and the first cell occurs, the terminal device records the connection establishment failure information and starts the timer. After the timer expires, if the terminal device does not have a service-triggered connection establishment request, the terminal device may actively trigger a connection establishment procedure, to test an uplink coverage status at a current location of the terminal device in the first cell. If a first network device managing the first cell receives the connection establishment request of the terminal device, the first network device may send a response message (such as a reject message, a release message, or another response message) to the terminal device. If the terminal device receives the foregoing response message, the terminal device stops an uplink coverage test procedure in the first cell; and if the terminal device does not receive the foregoing response message, the terminal device determines that a connection establishment failure between the terminal device and the first cell occurs again, and the terminal device records corresponding connection establishment failure information, and starts the timer again. Optionally, the uplink coverage test procedure in the first cell may be performed again. However, this application is not limited thereto.

When a connection failure between the terminal device and the first cell occurs during the running of the timer, in the foregoing implementation 1, the terminal device does not record new connection establishment failure information: in the foregoing implementation 2, the terminal device updates some information (for example, updates a quantity of connection establishment failures) in the connection establishment failure information recorded after a previous connection establishment failure occurs; and in the foregoing implementation 3, the terminal device records the connection establishment failure information (optionally, the connection establishment failure information includes a quantity of connection establishment failures during running of the timer) corresponding to the current connection establishment failure, and deletes the connection establishment failure information recorded previously. In this way, the probability that the terminal device records similar connection establishment failure information at a same location or a close location can be reduced, and memory usage and power consumption of the terminal device can be reduced.

Optionally, after the timer expires, if the terminal device determines that a connection establishment failure between the terminal device and the first cell occurs again, the terminal device records fourth connection establishment failure information. In this way, the terminal device may record connection establishment failure information at a time interval. After the terminal device establishes a connection to the network, the terminal device may provide comprehensive information related to the connection establishment failure for the network device, so that the network device optimizes a network configuration more accurately. This can improve network performance.

Optionally, while the timer is running, if the terminal device moves to a second cell or the terminal device successfully establishes a connection to the first cell, the timer is stopped.

For content of the connection establishment failure information, refer to the foregoing description. Details are not described herein again. In a specific example, a format of the connection establishment failure information (CEF information, CEF info) may be shown in Table 1. However, this application is not limited thereto.

TABLE 1

| | CEF info |
|---|---|
| Information field in the CEF info | Description of the information field in the CEF info |
| Indication information indicating a quantity of connection establishment failures | Indicates a quantity of connection establishment failures or a total quantity of connection establishment failures during running of a timer |
| Cell identifier of a cell with a connection establishment failure | For example, a cell global identifier (CGI) or another identifier of the cell, where for details, refer to the foregoing description |
| Measurement result of the cell with the connection establishment failure | Includes a parameter value of the measurement result of the cell with the connection establishment failure, and the like |
| Location information | Indicates a location of a terminal device at a moment of a connection establishment failure |
| Measurement result of a neighboring cell | Includes a parameter value of the measurement result of the neighboring cell of a cell with a connection establishment failure at a moment of connection establishment failure, and the like are included |

TABLE 1-continued

| CEF info | |
|---|---|
| Random access information in a connection establishment process | Information related to a random access procedure at a moment of connection establishment is included |
| Time information | Indicates a time point for determining that a connection establishment failure occurs, for example, including a time interval, where the time interval is a time interval between the time point for determining that the connection establishment failure occurs and a time point for sending connection establishment failure information |

Optionally: the terminal device maintains a connection establishment failure information list (CEF info list) related to a connection establishment failure of the first cell. One CEF info list may include at least one piece of CEF info. When a connection establishment failure between the terminal device and the first cell occurs, the terminal device records, updates, or deletes, in the CEF info list, the connection establishment failure information related to the connection establishment failure of the first cell.

For example, after a connection establishment failure (denoted as a CEF 1) between the terminal device and the first cell occurs, the terminal device generates a connection establishment failure information list (CEF info list) related to the connection establishment failure of the first cell, records connection establishment failure information (for example, CEF1 info) related to the current connection establishment failure in the list, and starts the timer. If a connection establishment failure (denoted as a CEF 2) between the terminal device and the first cell occurs again during running of the timer, the terminal device may determine, based on the foregoing manner 1, manner 2, or manner 3, a manner of processing the connection establishment failure information. For example, the terminal device uses the foregoing manner 2, and the terminal device updates indication information indicating a quantity of connection establishment failures in the CEF1 info. For example, the quantity of connection establishment failures K in the CEF1 info may be updated from 1 to 2. It may be understood that another parameter in the CEF 1 info remains unchanged. For example, the terminal device records CEF2 info and deletes the CEF1 info through the foregoing manner 3. To be specific, the terminal device records the CEF2 info in the CEF info list and deletes the CEF1 info in the CEF info list. It should be understood that if the CEF info includes indication information K indicating a quantity of connection establishment failures, the indication information indicating the quantity of connection establishment failures may be set to 2. After the timer expires, if a connection establishment failure (denoted as a CEF 3) between the terminal device and the first cell occurs again, the terminal device records CEF3 info in the CEF info list. To be specific, the CEF3 info is added on a basis of the CEF2 info. Then, a similar processing method is used. The CEF info list may be shown in Table 2. The CEF info list includes n pieces of CEF info, where $1 \le n \le N$, and N is a maximum quantity of pieces of connection establishment failure information that may be recorded by the terminal device. However, this application is not limited thereto.

TABLE 2

| CEF info list | |
|---|---|
| Information field in CEF info | Description of the information field in the CEF info |
| CEF2 info | Connection establishment failure information corresponding to a CEF 2 |
| CEF3 info | Connection establishment failure information corresponding to a CEF 3 |
| . . . | . . . |

Optionally, before the terminal device starts the timer in S210, the terminal device determines that a moving speed of the terminal device is less than or equal to a threshold A.

To be specific, after a connection establishment failure between the terminal device and the first cell occurs, if the moving speed of the terminal device is less than or equal to the threshold A, the terminal device starts the timer. If the moving speed of the terminal device is greater than the threshold A, the terminal device does not start the timer. If the moving speed of the terminal device is low, there is a high probability that the locations at which two consecutive connection establishment failures occur on the terminal device are the same or close, and connection establishment failure information (for example, measurement information of the first cell) may be similar. A probability that the terminal device records similar connection establishment failure information can be reduced by starting the timer. If the moving speed of the terminal device is high, the locations at which two consecutive connection establishment failures occur on the terminal device may be far away, and information related to the connection establishment failures may be different. Therefore, the terminal device may not need to start the timer, to record information related to each connection establishment failure. Through this solution, in addition to properly reducing memory usage and power consumption of the terminal device, the network device may optimize a network configuration more accurately. This can improve network performance.

Optionally, the threshold A may be specified in a protocol, or the threshold A is configured by the first network device for the terminal device.

Optionally, the terminal device may further record a value of the threshold A and/or the running duration of the timer, so that the network device determines whether the threshold A/running duration of the timer needs to be adjusted.

For example, the terminal device may record the value of the threshold A and/or the running duration of the timer in the CEF info list or the CEF info. It should be understood that the running duration of the timer herein may be maximum running duration of the timer and/or a time length for which the timer has been running. For example, maximum running time of the timer is 10 s, and the timer is stopped after running for 4 s. The running duration of the timer recorded by the terminal device may be 10 s, 4 s, or 10 s and 4 s.

S230. The terminal device sends a connection establishment failure report, where the connection establishment failure report indicates that the connection establishment failure occurs between the terminal device and the first cell.

After processing the first connection establishment failure information in the manner in S220, the terminal device may determine/generate the connection establishment failure report based on the connection establishment failure information that is recorded finally and that is related to the connection establishment failure between the terminal device and the first cell. Optionally, the connection establishment failure report may include some or all connection establishment failure information. For example, the CEF info list includes two pieces of CEF info, and the connection establishment failure report may include either piece of CEF info or two pieces of CEF info.

After the terminal device establishes a connection to a second network device, the terminal device sends the connection establishment failure report to the second network device. Correspondingly, the second network device receives the connection establishment failure report from the terminal device. The second network device and the first network device may be a same network device or different network devices.

For example, the terminal device establishes a connection to the first network device after re-initiating a connection establishment request in the first cell. Alternatively, the terminal device establishes a connection to the first network device after moving to another cell managed by the first network device. Alternatively, the terminal device moves to a coverage area of another network device and establishes a connection to the network device. This is not limited in this application.

In referring to a scenario in which at least one connection establishment failure occurs between the terminal device and the first cell before the terminal device establishes a connection to the second network device, the terminal device records at least one piece of connection establishment failure information based on the manner 1, the manner 2, or the manner 3. After the terminal device establishes the connection to the second network device, the terminal device sends the at least one piece of connection establishment failure information to the second network device by using the connection establishment failure report. However, this application is not limited thereto.

Optionally, the at least one piece of connection establishment failure information that is related to the connection establishment failure between the terminal device and the first cell and that is recorded by the terminal device may be included in a same connection establishment failure report or different connection establishment failure reports.

In one implementation, the terminal device sends one connection establishment failure report, where the connection establishment failure report includes the first connection establishment failure information and the fourth connection establishment failure information. For example, through the manner 1 in S220, during the running of the timer, the terminal device does not record connection establishment failure information, and reserves the first connection establishment failure information. After the timer expires, if the connection establishment failure between the terminal device and the first cell occurs again, the terminal device records the fourth connection establishment failure information. In addition, the terminal device successfully establishes a connection to the second network device when initiating next connection establishment.

Optionally, the first connection establishment failure information and the fourth connection establishment failure information are sequentially arranged in the connection establishment failure report in a time sequence of recording the information.

For example, if the first connection establishment failure information is recorded before the fourth connection establishment failure information, the first connection establishment failure information is arranged before the fourth connection establishment failure information in the connection establishment failure report. However, this application is not limited thereto.

In another implementation, the terminal device sends at least two connection establishment failure reports, and the first connection establishment failure information and the second connection establishment failure information may be included in different connection establishment failure reports.

Optionally, the terminal device may send corresponding connection establishment failure reports based on a time sequence in which a plurality of pieces of connection establishment failure information related to connection establishment failures between the terminal device and the first cell is recorded.

For example, the terminal device successively records, based on a time sequence in which the connection establishment failures occur, the first connection establishment failure information and the fourth connection establishment failure information that correspond to the connection establishment failures. The terminal device may first send a first connection establishment failure report including the first connection establishment failure information to the second network device, and then send a second connection establishment failure report including the fourth connection establishment failure information to the second network device. However, this application is not limited thereto.

For example, when the plurality of pieces of connection establishment failure information that are recorded by the terminal device and that are related to the connection establishment failures between the terminal device and the first cell may be included in a same connection establishment failure report, the report may include the foregoing CEF info list that is recorded by the terminal device and that is related to the connection establishment failures between the terminal device and the first cell. The CEF info list includes the plurality of pieces of connection establishment failure information that are recorded by the terminal device and that are related to the connection establishment failures between the terminal device and the first cell, for example, the CEF info list as shown in Table 2. When the first network device and the second network device are different network devices, the second network device may transmit the connection establishment failure report to the first network device in but not limited to the following two manners.

Manner A: If the first network device and the second network device establish a communication interface (such as, an X2 interface or an Xn interface), after receiving the connection establishment failure report from the terminal device, the second network device sends the connection establishment report to the first network device through the communication interface between the second network device and the first network device.

As an example and without limitation, the connection establishment failure report is carried in a failure indication (FAILURE INDICATION or RLF INDICATION) message, a handover report (HANDOVER REPORT) message, an access and mobility indication (ACCESS AND MOBILITY INDICATION) message, or another message that is sent by the second network device to the first network device.

Manner B: If no communication interface is established between the first network device and the second network device, the second network device may send the connection establishment report to a core network device through a communication interface (for example, an S1 interface or an NG interface) between the second network device and the core network device, and then the core network device forwards the connection establishment report to the first network device.

As an example and without limitation, the connection establishment failure report is carried in an uplink RAN configuration transfer message, a downlink RAN configuration transfer message, a base station (eNB) configuration transfer message, a core network device (MME) configuration transfer message, or another message.

Optionally, the first network device has a CU-DU separation architecture. After receiving the connection establishment failure report indicating the connection establishment failure between the terminal device and the first cell, the core network device sends the connection establishment failure report to a CU of the first network device. Optionally, the CU of the first network device further forwards the connection establishment failure report to a DU to which the first cell of the first network device belongs. Optionally, the CU of the first network device may include a CU-CP and a CU-UP. After receiving the connection establishment report sent by the core network device, the CU-CP of the first network device may forward the connection establishment report to the CU-UP. As an example and without limitation, the connection establishment failure report is carried in an access and mobility indication message or another message that is sent by the CU (or the CU-CP) of the first network device to the DU (or the CU-UP) of the first network device.

After receiving the connection establishment failure report, the first network device may optimize a network configuration or the like based on the connection establishment failure information, to improve communication performance of the network. However, this application is not limited thereto.

For example, the first network device may analyze, based on the connection establishment failure information between the terminal device and the first cell, a reason for the connection establishment failure. For example, the connection establishment failure is caused by a mismatch between downlink coverage and uplink coverage. The network device may adjust the coverage to improve a success rate of accessing the network by the terminal device. For another example, the terminal device may feed back the running duration of the timer and/or the threshold A to the network. After obtaining the running duration of the timer and/or the threshold A, the first network device may adjust the running duration of the timer and/or the threshold A to adjust a frequency at which the terminal device records the connection establishment failure, so that the network device may better optimize the network configuration based on the connection establishment failure information, and improve communication performance of the network device. However, this application is not limited thereto. It may be understood that the first network device may adjust or optimize one or more parameters. Optionally, the terminal device sends first indication information to the second network device, where the first indication information indicates the running duration of the timer, and the second network device forwards the first indication information to the first network device (or the second network device forwards the first indication information to the first network device by using the core network device). The first indication information may be included in the connection establishment failure report, carried in a same message as the connection establishment failure report, or carried in a different message from the connection establishment failure report. This is not limited in this application.

Optionally, the first indication information may further include a time interval of consecutive connection establishment failures between the terminal device and the first cell each time the timer runs.

After receiving the first indication information, the first network device may adjust and optimize the configured running duration of the timer of the terminal device. However, this application is not limited thereto.

Optionally, the terminal device sends the threshold A to the second network device. The second network device forwards the threshold A to the first network device (or the second network device forwards the threshold A to the first network device by using the core network device). The threshold A may be included in the connection establishment failure report, carried in a same message as the connection establishment failure report, or carried in a different message from the connection establishment failure report. This is not limited in this application.

After receiving the threshold A, the first network device may determine whether the threshold A needs to be adjusted.

For example, the running duration of the timer and the threshold A may be included in the CEF info list in the connection establishment failure report. The CEF info list may be shown in Table 3. However, this application is not limited thereto.

TABLE 3

| CEF info list | |
| --- | --- |
| Information field in the CEF info list | Description of the information field in the CEF info list |
| CEF2 info | Connection establishment failure information corresponding to a CEF 2 |
| CEF3 info | Connection establishment failure information corresponding to a CEF 3 |
| . . . | . . . |
| CEFn info | Connection establishment failure information corresponding to a CEF n |
| Running duration of a timer | Value of the running duration of the timer |
| Moving speed threshold | Threshold A |

It should be understood that a quantity of pieces of connection establishment failure information in the connection establishment failure report may be less than or equal to the quantity of pieces of connection establishment failure information recorded by the terminal device. For example, the terminal device records two pieces of connection establishment failure information, and the connection establishment failure report may include one of the two pieces of connection establishment failure information, or may include both of the two pieces of connection establishment failure information. This application is not limited thereto.

It may be understood that in the foregoing embodiment, the timer used for controlling is used as an example for description, but it is not limited to using of timer. For example, the terminal device determines a time interval between a time point at which a previous connection establishment failure occurs and a time point at which a current connection establishment failure occurs, and determines, depending on whether the time interval is less than or equal to a time threshold, a manner of processing the connection establishment failure information. This application is not limited thereto. For a specific processing manner, refer to the foregoing description. Details are not described herein again.

The foregoing is a related description of a processing manner in which the terminal device determines, depending on whether the timer is running, connection establishment failure information according to this embodiment of this application. With reference to FIG. 3, the following describes a communication method in which the terminal device determines, based on location information of a connection establishment failure, the manner of processing the connection establishment failure information according to this embodiment of this application.

FIG. 3 is another schematic flowchart of a communication method 300 according to an embodiment of this application.

It should be noted that, unless otherwise defined or described, for a part in the embodiment shown in FIG. 3 that is the same as or similar to that in the embodiment shown in FIG. 2, refer to the description in the embodiment shown in FIG. 2. For brevity, details are not described herein again.

S310. A terminal device determines that a connection establishment failure between the terminal device and a first cell occurs at a first location, and records first connection establishment failure information.

Optionally, the first connection establishment failure information includes first location information, and the first location information indicates the first location. Optionally, a quantity of connection establishment failures recorded by the terminal device is 1.

It may be understood that a location of the terminal device may be determined/obtained based on a positioning function of the terminal device.

S320. The terminal device determines that a connection establishment failure between the terminal device and the first cell occurs again, and determines, based on the first location and a second location, whether to record second connection establishment failure information.

Specific implementations that the terminal device determines, based on the first location and the second location, whether to record the second connection establishment failure information may include but are not limited to the following implementations.

Implementation 1: The terminal device determines that a distance between the first location and the second location is greater than or equal to a threshold B, and the terminal device records the second connection establishment failure information. Optionally, the terminal device updates the recorded quantity of connection establishment failures to 2.

Optionally, the second connection establishment failure information includes second location, and the second location indicates the second location.

For example, after determining that the connection establishment failure between the terminal device and the first cell occurs again, the terminal device obtains the second location at which the terminal device is located when the connection establishment failure occurs again, and determines the distance between the second location and the first location indicated in the first location information. When the distance between the first location and the second location is greater than or equal to the threshold B, the terminal device records the second connection establishment failure information. Through this solution, the connection establishment failure information recorded by the terminal device may be recorded when the terminal device is located at different locations or the locations of the terminal device are different to some extent. In this way, the probability that the terminal device records the same or similar connection establishment failure information can be reduced, and memory usage and power consumption of the terminal device can be reduced.

In the implementation 1, if the terminal device has a connection establishment failure again with the first cell at a third location after having the connection establishment failure at the second location, the terminal device compares the distance between the second location corresponding to the second connection establishment failure information recently recorded and the third location with the threshold B, to determine whether to record third connection establishment failure information.

Implementation 2: The terminal device determines that a distance between the first location and the second location is less than or equal to a threshold B. and the terminal device does not record the second connection establishment failure information. Optionally, the terminal device updates the recorded quantity of connection establishment failures to 2.

Through this implementation, the probability that the terminal device records the same or similar connection establishment failure information can be reduced, and memory usage and power consumption of the terminal device can be reduced.

In the implementation 2, if the terminal device has a connection establishment failure again with the first cell at a third location after having the connection establishment failure at the second location, the terminal device compares a distance between the first location corresponding to the first connection establishment failure information recently recorded and the third location with the threshold B, to determine whether to record third connection establishment failure information.

In the implementation 2, as a possible implementation, if the terminal device determines that the distance between the first location and the third location is less than or equal to the threshold B, the terminal device does not record the third connection establishment failure information, and the terminal device may update indication information indicating a quantity of connection establishment failures in the first connection establishment failure information. For example, the terminal device updates the recorded quantity of connection establishment failures to 3.

For example, the terminal device determines that the distance between the first location and the second location is less than the threshold B. If the terminal device re-initiates connection establishment between the terminal device and the first cell and determines that a failure occurs again, the terminal device does not record the second connection establishment failure information, and only updates the indication information indicating the quantity of connection establishment failures in the first connection establishment failure information. However, this application is not limited thereto. Through this implementation, the probability that the terminal device records the same or similar connection establishment failure information can be reduced, and memory usage and power consumption of the terminal device can be reduced.

Optionally, after the terminal device determines that the connection establishment failure between the terminal device and the first cell has occurred, the terminal device may enter an uplink coverage test procedure for the first cell. If a distance between a current location of the terminal device and the first location is greater than or equal to a threshold C, the terminal device may initiate a connection establishment request or a connection resume request to test an uplink coverage status at the location of the terminal device. For example, a request reason may be a "connection establishment failure", an "uplink failure", an "uplink coverage test", or the like. It may be understood that the threshold C and the threshold B may be the same or different.

To be specific, the terminal device determines that the connection establishment failure between the terminal device and the first cell occurs, and records the first location. If the terminal device moves, and the connection establishment failure between the terminal device and the first cell occurs again, and if the distance between the current location of the terminal device and the first location is greater than or equal to the threshold C. and the terminal device does not have a service-triggered connection establishment request, the terminal device may actively trigger a connection establishment procedure, to test the uplink coverage status at the current location of the terminal device in the first cell. If a first network device managing the first cell receives the connection establishment request of the terminal device, the first network device may send a response message (such as a reject message, a release message, or another response message) to the terminal device. If the terminal device receives the response message, the terminal device stops the uplink coverage test procedure for the first cell. If the terminal device does not receive the response message, the terminal device determines that a connection establishment failure between the terminal device and the first cell occurs again, and the terminal device records the corresponding connection establishment failure information, and records the location information (optionally, the terminal device may delete the first location information) corresponding to the current location of the terminal device, for a location determining mechanism of entering the uplink coverage test procedure that is for the first cell next time.

Implementation 3: The terminal device determines that a distance between the first location and the second location is less than or equal to a threshold B. and the terminal device records the second connection establishment failure information, and deletes the first connection establishment failure information.

When the distance between the first location and the second location is less than or equal to the threshold B, the terminal device records only information related to a latest connection establishment failure that occurs at a location that is after the first location and from which a distance to the first location is less than the threshold B. If the terminal device has a connection establishment failure again with the first cell at a third location after having the connection establishment failure at the second location, the terminal device compares a distance between the first location and the third location with the threshold B, to determine whether to record third connection establishment failure information. If the distance between the first location and the third location is less than the threshold B, the terminal device records the third connection establishment failure information, and deletes the second connection establishment failure information. If the distance between the first location and the third location is greater than or equal to the threshold B, the terminal device records the third connection establishment failure information, and does not delete the second connection establishment failure information. However, this application is not limited thereto.

Implementation 4: The terminal device determines that a distance between the first location and the second location is less than or equal to a threshold B. and the terminal device updates, while the timer is running, indication information indicating a quantity of connection establishment failures in the first connection establishment failure information.

In a possible implementation of the implementation 4, with reference to the implementation 2 in the embodiment shown in FIG. 2, in S310, after the terminal device records the first connection establishment failure information, the terminal device starts the timer. In S320, after the connection establishment failure between the terminal device and the first cell occurs again, the terminal device determines that the distance between the first location and the second location is less than the threshold B, and the terminal device updates, during running of the timer, the indication information indicating the quantity of connection establishment failures in the first connection establishment failure information. If the timer expires, the terminal device does not update the indication information indicating the quantity of connection establishment failures in the first connection establishment failure information. However, this application is not limited thereto. In this implementation, if the terminal device has a connection establishment failure again with the first cell at a third location after having the connection establishment failure at the second location, the terminal device compares a distance between the first location and the third location with the threshold B, to determine whether to record third connection establishment failure information.

Implementation 5: The terminal device determines that a distance between the first location and the second location is less than or equal to a threshold B, and the terminal device records, while the timer is running, the second connection establishment failure information, and deletes the first connection establishment failure information.

In a possible implementation of the implementation 5, with reference to the implementation 3 in the embodiment shown in FIG. 2, in S310, after the terminal device records the first connection establishment failure information, the terminal device starts the timer. In S320, after the connection establishment failure between the terminal device and the first cell occurs again, the terminal device determines that the distance between the first location and the second location is less than the threshold B, and the terminal device records, during running of the timer, the second connection establishment failure information, and deletes the first connection establishment failure information. If the timer expires, the indication information indicating a quantity of connection establishment failures in the first connection establishment failure information is updated. If the timer expires, the terminal device records third connection establishment failure information, and does not delete the second connection establishment failure information. However, this application is not limited thereto.

Optionally, the threshold B is specified in a protocol, or the terminal device receives configuration information from a first network device (that is, a network device managing the first cell), and the configuration information is for configuring the threshold B.

Optionally; the terminal device may record a value of the threshold B in the connection establishment failure information, so that the network device determines whether the value of the threshold needs to be adjusted.

As an example and without limitation, the configuration information is carried in a system message of the first cell.

For example, the configuration information is carried in a MIB, a SIB1, or another system message of the first cell.

S330. The terminal device sends a connection establishment failure report, where the connection establishment failure report indicates that the connection establishment failure occurs between the terminal device and the first cell.

The terminal device determines/generates the connection establishment failure report based on recorded connection establishment failure information that is related to the connection establishment failure between the terminal device and the first cell. Optionally, the connection establishment failure report may include some or all of the connection establishment failure information. For a specific implementation of S330, refer to the specific implementation of S230 in the embodiment shown in FIG. 2. For brevity, details are not described herein again.

According to the foregoing solution, based on a location at which the terminal device is located when the connection establishment failure information is recorded, whether to record connection establishment failure information again or update the connection establishment failure information is determined. In this way, the probability that the terminal device records the same or similar connection establishment failure information can be reduced, and memory usage and power consumption of the terminal device can be reduced.

An embodiment of this application further provides a communication method. The method includes: after determining that a connection establishment failure has occurred between a terminal device and a first cell, the terminal device determines, depending on whether a reason for a current connection establishment failure is consistent with a reason for a previous connection establishment failure, whether to record connection establishment failure information related to the current connection establishment failure.

For example, the terminal device determines that a connection establishment failure occurs between the terminal device and the first cell because the quantity of times of sending a msg1 reaches a maximum quantity. Based on the reason for the previous connection establishment failure between the terminal device and the first cell, if the current connection establishment failure occurs also because the quantity of times of sending the msg1 reaches the maximum quantity, the terminal device skips recording the connection establishment failure information related to the current connection establishment failure, and optionally, updates the indication information to indicate a quantity of connection establishment failures in connection establishment failure information recorded previously. If the previous failure occurs because a msg2 is not received, the terminal device records the connection establishment failure information related to the current connection establishment failure. However, this application is not limited thereto.

Optionally, this embodiment may be separately combined with the embodiments shown in FIG. 2 and FIG. 3. For example, if the terminal device determines that the reason for the current connection establishment failure between the terminal device and the first cell is consistent with the reason for the previous connection establishment failure between the terminal device and the first cell, and during the running of a timer and/or the distance between locations of the terminal device at which two failures occur is less than a threshold B, the terminal device does not record the current connection establishment failure information or updates information about a current connection establishment failure between the terminal device and the first cell in previous connection establishment failure information, or the terminal device records the current connection establishment failure information, and deletes the connection establishment failure information recorded previously. Alternatively, the terminal device determines that the reason for the current connection establishment failure between the terminal device and the first cell is different from the reason for the previous connection establishment failure between the terminal device and the first cell. Even if during running of a timer and/or a distance between locations of the terminal device at which two failures occur is less than a threshold B, the terminal device records the current connection establishment failure information. In this way, the terminal device can record information about connection establishment failures caused by different reasons, so that after the information is sent to a first network device, the first network device can optimize a network configuration more accurately. However, this application is not limited thereto.

The foregoing describes in detail the method provided in embodiments of this application with reference to FIG. 2 and FIG. 3. The following describes in detail an apparatus provided in embodiments of this application with reference to FIG. 4 to FIG. 6. To implement functions in the method provided in embodiments of this application, network elements may include a hardware structure and/or a software module, and the foregoing functions are implemented in a form of the hardware structure, the software module, or a combination of the hardware structure and the software module. Whether a specific function in the foregoing functions is performed by the hardware structure, the software module, or the combination of the hardware structure and the software module depends on a particular application and a design constraint of the technical solutions.

FIG. 4 is a schematic block diagram of a communication apparatus according to an embodiment of this application. As shown in FIG. 4, the communication apparatus 400 may include a processing unit 410 and a transceiver unit 420.

In a possible design, the communication apparatus 400 may correspond to the terminal device in the foregoing method embodiments, a component (such as, a chip or a circuit) disposed in (or for) the terminal device, or another apparatus, module, circuit, unit or the like that may implement a method of the terminal device.

It should be understood that the communication apparatus 400 may correspond to the steps or the procedure implemented by the terminal device in the method 200 and the method 300 in embodiments of this application. The communication apparatus 400 may include a unit (e.g., processors or circuits) configured to perform the method performed by the terminal device in the method 200 and the method 300 in FIG. 2 and FIG. 3. In addition, the units (e.g., processors or circuits) in the communication apparatus 400 and the foregoing other operations and/or functions are respectively for implementing corresponding procedures of the method 200 and the method 300 in FIG. 2 and FIG. 3.

In some possible implementations, the transceiver unit 420 in the communication apparatus 400 may be an input/output interface or a circuit in a chip, and the processing unit 410 in the communication apparatus 400 may be a processor in the chip.

Optionally, the processing unit 410 may be configured to process instructions or data, to implement a corresponding operation.

Optionally, the communication apparatus 400 may further include a storage unit 430. The storage unit 430 may be configured to store instructions or data. The processing unit 410 may read/execute the instructions or the data stored in the storage unit, to enable the communication apparatus to implement a corresponding operation. In a possible implementation, the transceiver unit 420 in the communication apparatus 400 may correspond to a transceiver 510 in a terminal device 500 shown in FIG. 5, and the storage unit 430 may correspond to a memory in the terminal device 500 shown in FIG. 5.

When the communication apparatus performs the method 200 shown in FIG. 2, for example, the processing unit is configured to determine that a connection establishment failure between a terminal device and a first cell occurs, record first connection establishment failure information, and start a timer: the processing unit is further configured to determine, depending on whether the timer runs, a manner of processing connection establishment failure information; and the transceiver unit is configured to send a connection establishment failure report, where the connection establishment failure report indicates that the connection establishment failure occurs between the terminal device and the first cell.

In an implementation, the processing unit is configured to stop recording the connection establishment failure information during running of the timer.

In another implementation, the processing unit is configured to: during running of the timer, determine that a connection establishment failure between the terminal device and the first cell occurs again, and update the indication information to indicate a quantity of connection establishment failures in the first connection establishment failure information, where the connection establishment failure report includes the first connection establishment failure information.

In another implementation, the processing unit is configured to: during running of the timer, determine that a connection establishment failure between the terminal device and the first cell occurs again, record the second connection establishment failure information and delete the third connection establishment failure information, where the third connection establishment failure information is the first connection establishment failure information or the connection establishment failure information recorded after the first connection establishment failure information, and the connection establishment failure report includes the second connection establishment failure information.

Optionally, the processing unit is further configured to: after the timer expires, determine that a connection establishment failure between the terminal device and the first cell occurs again, record the fourth connection establishment failure information, and start the timer, where the connection establishment failure report includes the fourth connection establishment failure information.

Optionally, the processing unit is further configured to stop the timer when the terminal device moves to a second cell or the terminal device successfully establishes a connection to the first cell during running of the timer.

Optionally, the processing unit is further configured to start the timer when determining that a moving speed of the terminal device is less than or equal to a first threshold.

Optionally, the transceiver unit is further configured to receive first indication information from a first network device, where the first indication information indicates running duration of the timer, and the first network device is a network device managing the first cell.

When the communication apparatus performs the method 300 shown in FIG. 3, for example, the processing unit is configured to determine that a terminal device fails in establishing a connection between the terminal device and a first cell at a first location, and record the first connection establishment failure information: the processing unit is further configured to determine that the terminal device fails in establishing a connection between the terminal device and the first cell again at a second location, and determine, based on the first location and the second location, whether to record the second connection establishment failure information; and the transceiver unit is configured to send a connection establishment failure report, where the connection establishment failure report indicates that a connection establishment failure has occurred between the terminal device and the first cell.

Optionally, the processing unit is configured to determine that a distance between the first location and the second location is greater than or equal to a first threshold, and record the second connection establishment failure information; and/or the processing unit is configured to determine that the distance between the first location and the second location is less than the first threshold, and skip recording the second connection establishment failure information.

Optionally, the transceiver unit is further configured to receive first indication information from a first network device, where the first indication information indicates the first threshold, and the first network device is a network device managing the first cell.

It should be understood that a specific process in which the units perform the foregoing corresponding steps has been described in detail in the foregoing method embodiments. For brevity, details are not described herein again.

It should be further understood that when the communication apparatus 400 is a terminal device, the transceiver unit 420 in the communication apparatus 400 may be implemented by using a communication interface (such as, a transceiver, a transceiver circuit, a pin, or an input/output interface), and for example, may correspond to a transceiver 510 in a terminal device 500 shown in FIG. 5. The processing unit 410 in the communication apparatus 400 may be implemented by using at least one processor, and for example, may correspond to a processor 520 in the terminal device 500 shown in FIG. 5. The processing unit 410 in the communication apparatus 400 may be implemented by using at least one logic circuit.

In another possible design, the communication apparatus 400 may correspond to the network device in the foregoing method embodiments, for example, a component (such as, a chip or a circuit) disposed in (or for) the network device, or another apparatus, module, circuit, unit or the like that may implement a method of the network device.

It should be understood that the communication apparatus 400 may correspond to the step or the procedure implemented by the network device in the method 200 and the method 300 in embodiments of this application. The communication apparatus 400 may include a unit configured to perform the method performed by the network device in the method 200 and the method 300 in FIG. 2 and FIG. 3. In addition, the units in the communication apparatus 400 and the foregoing other operations and/or functions are respectively for implementing corresponding procedures of the method 200 and the method 300 in FIG. 2 and FIG. 3.

In some possible implementations, the transceiver unit in the communication apparatus 400 may be an input/output interface or a circuit in a chip, and the processing unit 410 in the communication apparatus 400 may be a processor in the chip.

Optionally, the processing unit 410 may be configured to process instructions or data, to implement a corresponding operation.

Optionally, the communication apparatus 400 may further include a storage unit 430. The storage unit may be configured to store instructions or data. The processing unit may read/execute the instructions or the data stored in the storage unit 430, to enable the communication apparatus to implement a corresponding operation. In a possible implementation, the storage unit 430 in the communication apparatus 400 may correspond to a memory in a network device 600 shown in FIG. 6.

When the communication apparatus performs the method 200 shown in FIG. 2, for example, the processing unit is configured to determine running duration of a timer, where the timer is used by a terminal device to determine a manner of processing connection establishment failure information; and the transceiver unit is configured to send first indication information to the terminal device, where the first indication information indicates the running duration of the timer.

When the communication apparatus performs the method 300 shown in FIG. 3, for example, the processing unit is configured to determine a first threshold, where the first threshold is used by a terminal device to determine whether to record connection establishment failure information; and the transceiver unit is configured to send first indication information to the terminal device, where the first indication information indicates the first threshold.

It should be understood that a specific process in which the units perform the foregoing corresponding steps has been described in detail in the foregoing method embodiments. For brevity, details are not described herein again.

Figure 6:
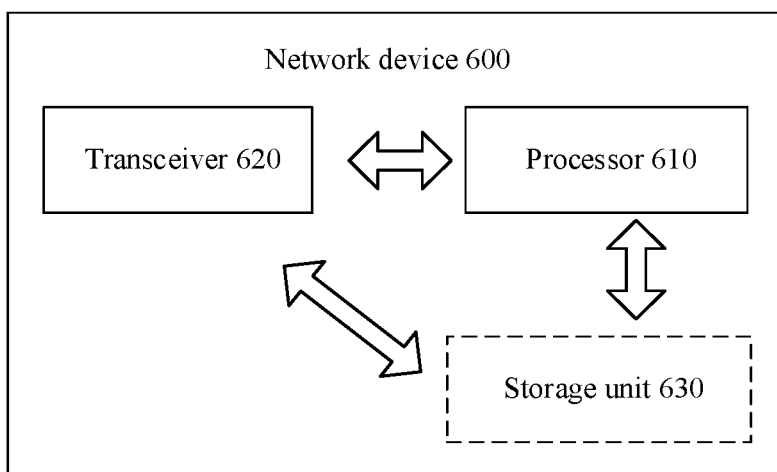
FIG. 6 is a schematic diagram of a structure of a network device applicable to an embodiment of this application.

It should be further understood that when the communication apparatus 400 is a network device, the transceiver unit 420 in the communication apparatus 400 may be implemented by using a communication interface (such as, a transceiver, a transceiver circuit, a pin, or an input/output interface), and for example, may correspond to a transceiver 610 in the network device 600 shown in FIG. 6. The processing unit 410 in the communication apparatus 400 may be implemented by using at least one processor, and for example, may correspond to a processor 620 in the network device 600 shown in FIG. 6. The processing unit 410 in the communication apparatus 400 may be implemented by using at least one logic circuit.

FIG. 5 is a schematic diagram of a structure of a terminal device 500 according to an embodiment of this application. The terminal device 500 may be applied to the system shown in FIG. 1, and perform a function of the terminal device in the foregoing method embodiments. As shown in the figure, the terminal device 500 includes a processor 520 and a transceiver 510. Optionally, the terminal device 500 further includes a memory. The processor 520, the transceiver 510, and the memory may communicate with each other by using an internal connection route, to transmit a control signal and/or a data signal. The memory is configured to store a computer program. The processor 520 is configured to execute the computer program in the memory, to control the transceiver 510 to send and receive a signal.

The processor 520 and the memory may be combined into a processing apparatus, and the processor 520 is configured to execute program code stored in the memory to implement the foregoing functions. During specific implementation, the memory may be integrated into the processor 520, or may be independent of the processor 520. The processor 520 may correspond to the processing unit in FIG. 4.

The transceiver 510 may correspond to the transceiver unit in FIG. 4. The transceiver 510 may include a receiver (or referred to as a receiver machine or a receiver circuit) and a transmitter (or referred to as a transmitter machine or a transmitter circuit). The receiver is configured to receive a signal, and the transmitter is configured to transmit a signal.

It should be understood that the terminal device 500 shown in FIG. 5 may implement processes related to the terminal device in the method embodiments shown in FIG. 2 and FIG. 3. Operations and/or functions of the modules in the terminal device 500 are respectively for implementing corresponding procedures in the foregoing method embodiments. For details, refer to the descriptions in the foregoing method embodiments. To avoid repetition, detailed descriptions are appropriately omitted herein.

The processor 520 may be configured to perform an action that is implemented inside the terminal device and that is described in the foregoing method embodiments. The transceiver 510 may be configured to perform a sending action by the terminal device for the network device or a receiving action from the network device and that is described in the foregoing method embodiments. For details, refer to the descriptions in the foregoing method embodiments. Details are not described herein again.

Optionally; the terminal device 500 may further include a power supply, configured to supply power to various devices or circuits in the terminal device.

In addition, to improve a function of the terminal device, the terminal device 500 may further include one or more of an input unit, a display unit, an audio circuit, a camera, a sensor, and the like. The audio circuit may further include a speaker, a microphone, and the like.

FIG. 6 is a schematic diagram of a structure of a network device according to an embodiment of this application. The network device 600 may be applied to the system shown in FIG. 1, and perform a function of the network device in the foregoing method embodiments. For example, FIG. 6 may be a schematic diagram of a structure related to a network device. As shown in the figure, the network device 600 includes a processor 620 and a transceiver 610. Optionally, the network device 600 further includes a memory. The processor 620, the transceiver 610, and the memory may communicate with each other by using an internal connection route, to transmit a control signal and/or a data signal. The memory is configured to store a computer program. The processor 620 is configured to execute the computer program in the memory, to control the transceiver 610 to send and receive a signal.

It should be understood that the network device 600 shown in FIG. 6 may implement processes related to the network device in the method embodiments shown in FIG. 2 and FIG. 3. Operations and/or functions of the modules in the network device 600 are respectively for implementing corresponding procedures in the foregoing method embodiments. For details, refer to the descriptions in the foregoing method embodiments. To avoid repetition, detailed descriptions are appropriately omitted herein.

It should be understood that the network device 600 shown in FIG. 6 may be an eNB or a gNB. Optionally, the network device includes a network device of a CU, a DU, an AAU, and the like. Optionally, the CU may be classified into a CU-CP and a CU-UP. A specific architecture of the network device is not limited in this application.

An embodiment of this application further provides a processing apparatus, including a processor and a (communication) interface. The processor is configured to perform the method in any one of the foregoing method embodiments.

It should be understood that the processing apparatus may be one or more chips. For example, the processing apparatus may be a field programmable gate array (FPGA), an application-specific integrated circuit (ASIC), a system on chip (SoC), or a central processor unit (CPU), a network processor (NP), a digital signal processor (DSP), a micro controller unit (MCU), a programmable logic device (PLD), or another integrated chip.

In this embodiment of this application, the memory may be a non-volatile memory, for example, a hard disk drive (HDD) or a solid-state drive (SSD), or may be a volatile memory, for example, a random-access memory (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

According to the methods provided in embodiments of this application, this application further provides a computer program product. The computer program product includes computer program code (or instructions). When the computer program code is executed by one or more processors, an apparatus including the processor is enabled to perform the methods in the embodiments shown in FIG. 2 and FIG. 3.

All or some of the technical solutions in embodiments of this application may be implemented by using software, hardware, firmware, or any combination thereof. When the software is for implementation, all or some of the technical solutions may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, a network device, a terminal device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium, or the like.

According to the methods provided in embodiments of this application, this application further provides a computer-readable storage medium. The computer-readable storage medium stores program code (or instructions). When the program code is run by one or more processors, an apparatus including the processor is enabled to perform the methods in the embodiments shown in FIG. 2 and FIG. 3.

According to the methods provided in embodiments of this application, this application further provides a system. The system includes the foregoing one or more network devices. The system may further include the foregoing one or more terminal devices.

The network device and the terminal device in the foregoing apparatus embodiments correspond to the network device and the terminal device in the method embodiments. A corresponding module or unit performs a corresponding step. For example, a communication unit (a transceiver) performs a receiving step or a sending step in the method embodiments, and other steps than the sending step and the receiving step may be performed by a processing unit (a processor). For a specific function of the unit, refer to the corresponding method embodiments. There may be one or more processors.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In embodiments of this application, without logical contradiction, the embodiments may be mutually referenced. For example, the methods and/or terms between the method embodiments may be mutually referenced. For example, the functions and/or terms between the apparatus embodiments may be mutually referenced. For example, the functions and/or terms between the apparatus embodiments and the method embodiments may be mutually referenced.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
 determining that a terminal device fails in establishing a connection between the terminal device and a first cell at a first location, and recording first connection establishment failure information;

determining that the terminal device fails in establishing a connection between the terminal device and the first cell again at a second location, and determining, based on the first location and the second location, whether to record second connection establishment failure information; and sending a connection establishment failure report, wherein the connection establishment failure report indicates that a connection establishment failure occurs between the terminal device and the first cell;

wherein the determining, based on the first location and the second location, whether to record second connection establishment failure information comprises:

when determining that a distance between the first location and the second location is greater than a first threshold, recording the second connection establishment failure information; and when determining that the distance between the first location and the second location is less than or equal to the first threshold, skipping recording the second connection establishment failure information, or recording the second connection establishment failure information, and deleting the first connection establishment failure information, or updating, during a running timer, indication information indicating a quantity of connection establishment failures in the first connection establishment failure information, or recording, during a running timer, the second connection establishment failure information, and deleting the first connection establishment failure information.

2. The method according to claim 1, wherein the method further comprises:

receiving first indication information from a first network device, wherein the first indication information indicates the first threshold, and the first network device is a network device managing the first cell.

3. The method according to claim 1, further comprising:

receiving information that indicates a running duration of the timer from the first network device.

4. A communication apparatus, comprising at least one processor coupled to a memory, wherein the memory is configured to store a program or instructions; and the at least one processor is configured to execute the program or the instructions to cause the apparatus to:

determine that a terminal device fails in establishing a connection between the terminal device and a first cell at a first location, and recording first connection establishment failure information;

determine that the terminal device fails in establishing a connection between the terminal device and the first cell again at a second location, and determine, based on the first location and the second location, whether to record second connection establishment failure information; and send a connection establishment failure report, wherein the connection establishment failure report indicates that a connection establishment failure occurs between the terminal device and the first cell;

wherein the determining, based on the first location and the second location, whether to record second connection establishment failure information comprises:

when determining that a distance between the first location and the second location is greater than to a first threshold, recording the second connection establishment failure information; and when determining that the distance between the first location and the second location is less than or equal to the first threshold, skipping recording the second connection establishment failure information, or recording the second connection establishment failure information, and deleting the first connection establishment failure information, or updating, during a running timer, indication information indicating a quantity of connection establishment failures in the first connection establishment failure information, or recording, during a running timer, the second connection establishment failure information, and deleting the first connection establishment failure information.

5. The apparatus according to claim 4, wherein the apparatus is further caused to:

receive first indication information from a first network device, wherein the first indication information indicates the first threshold, and the first network device is a network device managing the first cell.

6. The apparatus according to claim 4, wherein the apparatus is further caused to:

receive information indicates a running duration of the timer from the first network device.

7. A non-transitory computer-readable medium storing computer instructions, wherein when the computer instruction is read and executed by a processor in a communication apparatus, the communication apparatus is caused to perform:

determining that a terminal device fails in establishing a connection between the terminal device and a first cell at a first location, and recording first connection establishment failure information;

determining that the terminal device fails in establishing a connection between the terminal device and the first cell again at a second location, and determining, based on the first location and the second location, whether to record second connection establishment failure information; and sending a connection establishment failure report, wherein the connection establishment failure report indicates that a connection establishment failure occurs between the terminal device and the first cell;

wherein the determining, based on the first location and the second location, whether to record second connection establishment failure information comprises:

when determining that a distance between the first location and the second location is greater than a first threshold, recording the second connection establishment failure information; and when determining that the distance between the first location and the second location is less than or equal to the first threshold, skipping recording the second connection establishment failure information, or recording the second connection establishment failure information, and deleting the first connection establishment failure information, or updating, during a running timer, indication information indicating a quantity of connection establishment failures in the first connection establishment failure information, or recording, during a running timer, the second connection establishment failure information, and deleting the first connection establishment failure information.

8. The non-transitory computer-readable medium of claim 7, wherein when the computer instruction is read and executed by the processor in the communication apparatus, the communication apparatus is caused to further perform:

receiving first indication information from a first network device, wherein the first indication information indicates the first threshold, and the first network device is a network device managing the first cell.

9. The non-transitory computer-readable medium of claim 7, wherein when the computer instruction is read and executed by the processor in the communication apparatus, the communication apparatus is caused to further perform:

receiving information that indicates a running duration of the timer from the first network device.

\* \* \* \* \*